E. H. SUTTON.
Cotton-Cultivators.
No. 149,543. Patented April 7, 1874.
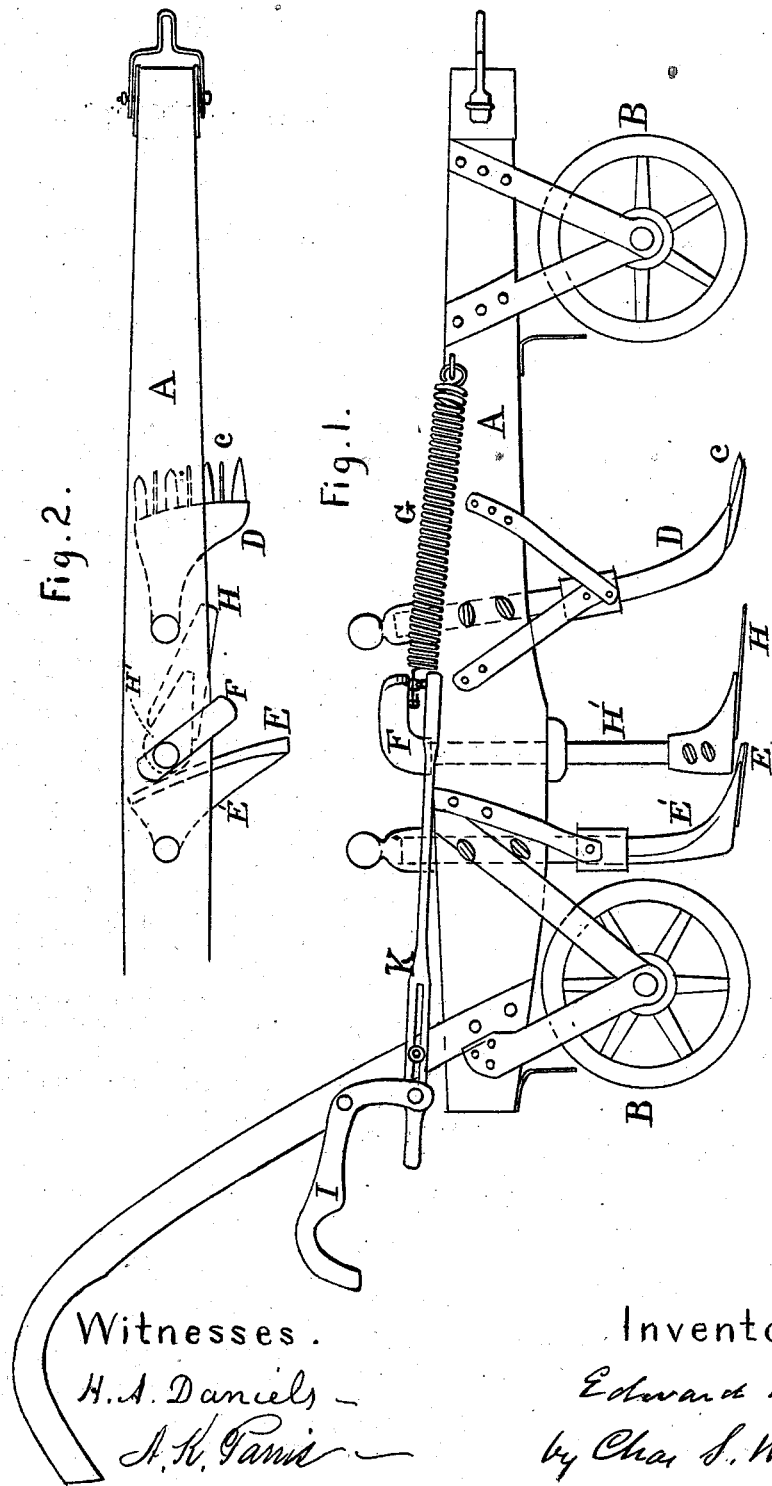
Witnesses.
H. A. Daniels
A. K. Parris
Inventor.
Edward H. Sutton
by Chas. S. Whitman
Atty

UNITED STATES PATENT OFFICE.

EDWARD H. SUTTON, OF EDENTON, NORTH CAROLINA.

IMPROVEMENT IN COTTON-CULTIVATORS.

Specification forming part of Letters Patent No. 149,543, dated April 7, 1874; application filed February 17, 1874.

*To all whom it may concern:*

Be it known that I, EDWARD H. SUTTON, of Edenton, county of Chowan and State of North Carolina, have invented certain Improvements in Cultivators and Plows. The following description, taken in connection with the accompanying plate of drawings hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to that class of agricultural implements commonly known as cotton-cultivators; and the nature thereof consists in certain improvements in the construction of the same, as hereinafter shown and described.

In the accompanying drawing, which illustrates my invention and forms a part of the specification thereof, Figure 1 is a side elevation of a cotton-cultivator with my improvements applied thereto. Fig. 2 is a plan illustrating the standards and showing the relative position of the blades herein described.

In the drawings referred to, A designates the beam, which is mounted upon the wheels B. The soil is loosened and pulverized by the teeth $c$ secured to the standard D, and the weeds are cut by the blades E and H, secured, respectively, to the standards E' and H'. The standard H', to which the blade H is secured, is so arranged that the said blade may be rotated in such a manner as to cut the weeds or thin out the growing cotton which is beyond the reach of the stationary blade E. This is done by means of the lever I, which is pivoted to a handle of the implement and connected by means of the slotted rod K to an arm, F, secured to the top of the standard H'. The spiral spring G, being also attached at one end to the said arm F, assists in operating the said standard H'.

Having thus described the construction of my invention, I claim and desire to secure by Letters Patent of the United States—

In a cotton-cultivator, the combination of the lever I, rod K, arm F, spring G, shaft or standard H', and blade H, as and for the purposes described.

In testimony that I claim the foregoing I have hereunto set my hand this 10th day of February, 1874.

EDWARD H. SUTTON.

Witnesses:
 H. A. DANIELS,
 A. K. PARRIS.